United States Patent
Min et al.

(10) Patent No.: US 10,678,425 B2
(45) Date of Patent: *Jun. 9, 2020

(54) TOUCH INPUT DEVICE AND VEHICLE INCLUDING THE SAME

(71) Applicants: HYUNDAI MOTOR COMPANY, Seoul (KR); KIA MOTORS CORPORATION, Seoul (KR); Hyundai Motor Europe Technical Center GmbH, Russelsheim (DE)

(72) Inventors: Jungsang Min, Seoul (KR); Nae Seung Kang, Siheung-si (KR); Gi Beom Hong, Bucheon-si (KR); Sung Un Kim, Yongin-si (KR); Seo Ho Choi, Seoul (KR); Sihyun Joo, Seoul (KR); Jeong-Eom Lee, Yongin-si (KR); Werner Peter, Russelsheim (DE); Andy Max Prill, Russelsheim (DE)

(73) Assignees: Hyundai Motor Company, Seoul (KR); Kia Motors Corporation, Seoul (KR); Hyundai Motor Europe Technical Center GMBH, Russelsheim (DE)

( * ) Notice: Subject to any disclaimer, the term of this patent is extended or adjusted under 35 U.S.C. 154(b) by 391 days.

This patent is subject to a terminal disclaimer.

(21) Appl. No.: 14/941,524

(22) Filed: Nov. 13, 2015

(65) Prior Publication Data

US 2016/0179366 A1 Jun. 23, 2016

(30) Foreign Application Priority Data

Nov. 13, 2014 (KR) .................. 10-2014-0157798
Jul. 8, 2015 (KR) .................. 10-2015-0097366

(51) Int. Cl.
*G06F 3/048* (2013.01)
*G06F 3/0488* (2013.01)
(Continued)

(52) U.S. Cl.
CPC .......... *G06F 3/04883* (2013.01); *B60K 35/00* (2013.01); *B60K 37/06* (2013.01);
(Continued)

(58) Field of Classification Search
CPC .......... G06F 3/048; G06F 2203/04104; G06F 2203/04808
See application file for complete search history.

(56) References Cited

U.S. PATENT DOCUMENTS 6,340,800 B1   1/2002   Zhai et al.
7,683,918 B2   3/2010   Bohan et al.
(Continued)

FOREIGN PATENT DOCUMENTS

CN   101517516 A   8/2009
CN   101939719 A   1/2011
(Continued)

OTHER PUBLICATIONS

Office Action issued in corresponding Korean Patent Application No. 10-2014-0157798, dated Apr. 8, 2015; with English translation.
(Continued)

*Primary Examiner* — Xuyang Xia
(74) *Attorney, Agent, or Firm* — Morgan, Lewis & Bockius LLP

(57) ABSTRACT

A touch input device includes a touch unit to which a user can input a touch gesture, wherein the touch unit includes a gesture input unit positioned at a center of the touch unit and a swiping input unit inclined downward along an edge of the
(Continued)

gesture input unit, and the gesture input unit and the swiping input unit receive separate touch signals.

23 Claims, 21 Drawing Sheets

(51) Int. Cl.
*G06F 3/041* (2006.01)
*G06F 3/0354* (2013.01)
*B60K 37/06* (2006.01)
*B60K 35/00* (2006.01)

(52) U.S. Cl.
CPC ........ *G06F 3/03547* (2013.01); *G06F 3/0416* (2013.01); *B60K 2370/126* (2019.05); *B60K 2370/143* (2019.05); *B60K 2370/146* (2019.05); *G06F 2203/0339* (2013.01); *G06F 2203/04104* (2013.01); *G06F 2203/04808* (2013.01)

(56) References Cited

U.S. PATENT DOCUMENTS

| | | | |
|---|---|---|---|
| 2003/0076301 A1* | 4/2003 | Tsuk | G06F 1/1626 345/159 |
| 2004/0046795 A1 | 3/2004 | Josephson et al. | |
| 2006/0095177 A1 | 5/2006 | Donk et al. | |
| 2006/0279554 A1 | 12/2006 | Shin et al. | |
| 2008/0284739 A1 | 11/2008 | Andrews et al. | |
| 2008/0293274 A1 | 11/2008 | Milan | |
| 2009/0135150 A1* | 5/2009 | Takashima | G06F 3/041 345/173 |
| 2009/0141046 A1* | 6/2009 | Rathnam | G06F 3/03547 345/661 |
| 2011/0043491 A1 | 2/2011 | Oh | |
| 2011/0109556 A1 | 5/2011 | Ganey et al. | |
| 2011/0110697 A1 | 5/2011 | Ganey et al. | |
| 2011/0148671 A1 | 6/2011 | Wong et al. | |
| 2012/0242588 A1 | 9/2012 | Myers et al. | |
| 2012/0243151 A1 | 9/2012 | Lynch | |
| 2013/0106734 A1 | 5/2013 | Schuler et al. | |
| 2014/0232668 A1 | 8/2014 | Kim | |
| 2014/0267136 A1 | 9/2014 | Phipps et al. | |
| 2015/0022475 A1 | 1/2015 | Watanabe et al. | |
| 2015/0041299 A1* | 2/2015 | Suzuki | H01H 3/0213 200/5 A |
| 2015/0175172 A1* | 6/2015 | Truong | B60W 50/10 701/36 |
| 2016/0188181 A1 | 6/2016 | Smith | |
| 2016/0334936 A1 | 11/2016 | Obata | |
| 2017/0010720 A1 | 1/2017 | Nakayama | |
| 2017/0075482 A1 | 3/2017 | Imai et al. | |

FOREIGN PATENT DOCUMENTS

| | | |
|---|---|---|
| CN | 102227795 A | 10/2011 |
| CN | 202582565 U | 12/2012 |
| CN | 103083907 A | 5/2013 |
| JP | 2009-025881 A | 2/2009 |
| JP | 2012-024890 A | 2/2012 |
| JP | 2012-247890 A | 12/2012 |
| JP | 2012256322 A | 12/2012 |
| JP | 2013-200664 A | 10/2013 |
| KR | 10-2006-0125468 A | 12/2006 |
| KR | 10-2012-0018636 A | 3/2012 |
| KR | 10-2014-0100367 A | 8/2014 |

OTHER PUBLICATIONS

U.S. Office Action issued in U.S. Appl. No. 14/941,520, dated Jun. 14, 2017.
U.S. Office Action issued in U.S. Appl. No. 14/941,520 dated Jan. 4, 2018, 22 pages.
U.S. Office Action issued in U.S. Appl. No. 14/941,520 dated Jun. 15, 2018.
U.S. Non-Final Office Action dated Dec. 31, 2018 issued in U.S. Appl. No. 14/941,520.
Apple Computer, Inc. iPod User's Guide, 2002, pp. 1-16 (with English translation).
Chinese Office Action dated Aug. 27, 2019 issued in Chinese Patent Application No. 201510771934X (with English translation).
Chinese Office Action dated Aug. 28, 2019 issued in Chinese Patent Application No. 2015107663039 (with English translation).

* cited by examiner

TOUCH INPUT DEVICE AND VEHICLE INCLUDING THE SAME

CROSS-REFERENCE TO RELATED APPLICATION

This application claims the benefit of priority to Korean Patent Application Nos. 10-2014-0157798 and 10-2015-0097366, filed on Nov. 13, 2014 and Jul. 8, 2015 respectively, with the Korean Intellectual Property Office, the disclosures of which are incorporated herein by reference.

TECHNICAL FIELD

Embodiments of the present disclosure relate to a touch input device and a vehicle including the same, and more particularly, to a touch input device to which a gesture can be input and a vehicle including the same.

BACKGROUND

With the development of telecommunication technology, a variety of electronic devices are being developed, and there is a current trend toward emphasizing designs of these electronic devices together with their operating convenience. Such a trend leads to a diversification of input devices represented by a keyboard or a key pad.

Input devices are used in various types of display systems that provide information to users, such as a portable terminal, a laptop computer, a smart phone, a smart pad, and a smart television. Recently, with the development of electronic devices, a method of inputting an instruction signal using a touch gesture is used in addition to an input method using a manipulation key, a dial, or so on.

Touch input devices are input devices constituting interfaces between information communication devices employing various displays and users. They enable interfacing between the information communication devices and the users when the users directly touch or approach touch pads or touch screens with input tools, such as fingers or touch pens.

Since anyone can easily use a touch input device simply by touching the touch input device with an input tool, such as a finger or a touch pen, touch input devices are being used in various devices, such as automated teller machines (ATM), personal digital assistants (PDA), and cellular phones and also are being used in many sectors, such as banking, government, and tourist and traffic information systems. A touch panel can be used together with a touch screen or separately used in a display system, and thus its utilization is increased.

SUMMARY OF THE DISCLOSURE

Therefore, it is an aspect of the present disclosure to provide a touch input device which provides improved handling or feeling of touch when a user inputs a gesture, and a vehicle including the touch input device.

It is another aspect of the present disclosure to provide a touch input device to which a user can intuitively and accurately input a gesture even without looking at a touch input unit, and a vehicle including the touch input device.

Additional aspects of the disclosure will be set forth in part in the description which follows and, in part, will be obvious from the description, or may be learned by practice of the disclosure.

In accordance with one aspect of the present disclosure, a touch input device includes a touch unit to which a user can input a touch gesture, wherein the touch unit includes a gesture input unit positioned at a center of the touch unit, a swiping input unit inclined downward along an edge of the gesture input unit, and the gesture input unit and the swiping input unit receive separate touch signals.

The gesture input unit may have a circular shape, and the swiping input unit may surround a circumferential edge of the gesture input unit.

The swiping input unit may be integrally formed with the gesture input unit, and inclined downward toward the gesture input unit.

The swiping input unit may include a plurality of gradations formed by engraving or embossing.

The gesture input unit may include a concave shape.

The gesture input unit may gradually deepen from an edge portion to a central portion or may have a uniform depth.

A slope of the swiping input unit may be larger than a tangential slope of the gesture input unit adjoining the swiping input unit.

The gesture input unit may include a curved concave shape whose slope becomes gentler toward a central portion.

The gesture input unit may have a greatest depth at a central portion.

The gesture input unit may include a partial spherical shape.

The gesture input unit may have an elliptical shape, and a lowest area in the gesture input unit may be positioned to deviate in any one direction from a center of the gesture input unit.

The gesture input unit may be capable of a pressing operation.

The gesture input unit may be capable of a tilting operation.

The gesture input unit may be pressed or tilted by a pressure applied by the user to receive a signal.

The gesture input unit may be capable of a tilting operation in four, that is, up, down, left and right, or more directions.

The touch input device may further include a button input tool for performing designated functions.

The button input tool may include a touch button for performing a designated function by a touch of the user, and a pressurizing button for performing a designated function when a position of the pressurizing button is changed by an external force applied by the user.

The touch input device may further include a wrist support tool positioned on one side of the touch unit to support a wrist of the user, and protruding higher than a touch surface of the touch unit.

In accordance with another aspect of the present disclosure, a touch input device includes a touch unit capable of receiving a touch gesture of a user, which includes a gesture input unit positioned at a center and a swiping input unit provided along an edge of the gesture input unit, and an edge unit surrounding the swiping input unit, wherein the swiping input unit gradually deepens from an edge portion toward a central portion or has a uniform depth.

The swiping input unit may be inclined downward between the edge unit and the gesture input unit.

In accordance with another aspect of the present disclosure, a vehicle includes the touch input device, a display device, and a control unit configured to operate the display device according to an input signal input to the touch input device.

The display device may be included in at least one of an audio system, an audio/video navigation (AVN) system, a dashboard, and a head-up display (HUD) device.

The control unit may convert a gesture input to the touch input device into the input signal, and send an operation signal to display an operation indicated by the input signal on the display device.

The touch input device may be installed in a gearbox.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 13 to 15 illustrate manipulation of the touch input device according to the second embodiment of the present disclosure in which FIG. 13 is a plan view showing a gesture input, FIG. 14 is a plan view showing a swiping input, and FIG. 15 is a plan view showing a pressing input;

DETAILED DESCRIPTION

Figure 1:
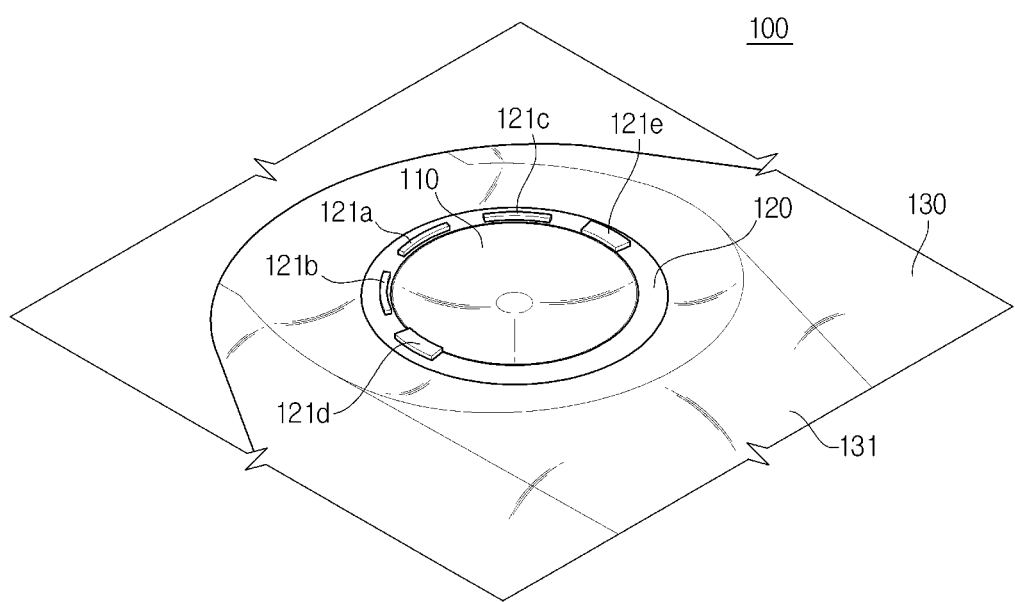
FIG. 1 is a perspective view of a touch input device according to a first embodiment of the present disclosure.

Reference will now be made in detail to the embodiments of the present disclosure, examples of which are illustrated in the accompanying drawings, wherein like reference numerals refer to like elements throughout.

FIG. 1 is a perspective view of a touch input device 100 according to a first embodiment of the present disclosure.

The touch input device 100 according to the first embodiment of the present disclosure may include a touch unit 110 that is installed on an installation surface 130.

The touch unit 110 may be provided as a predetermined area for receiving a touch signal of a user. For example, the touch unit 110 may have a circular planar shape as shown in the drawing. Alternatively, the touch unit 110 can have a variety of planar shapes including an elliptical shape.

The touch unit 110 may be a touch pad to which a signal is input when the user contacts or approaches the touch pad with a pointer, such as a finger or a touch pen. The user may input a desired instruction or command by inputting a predetermined touch gesture to the touch unit 110.

The touch pad may include a touch film, a touch sheet, etc. including a touch sensor in spite of its name. Also, the touch pad may include a touch panel that is a display device having a touchable screen.

Meanwhile, a case in which the position of the pointer is recognized when the pointer is close to, but not in contact with, the touch pad is referred to as a proximity touch, and a case in which the position is recognized when the pointer comes in contact with the touch pad is referred to as a contact touch. Here, the position of a proximity touch may be the position of the pointer perpendicularly corresponding to the touch pad when the pointer approaches the touch pad.

As the touch pad, a resistive touch pad, an optical touch pad, a capacitive touch pad, an ultrasonic touch pad, or a pressure touch pad may be used. In other words, various well-known touch pads may be used.

The touch unit 110 may be installed inside an edge unit 120. The edge unit 120 may denote a portion surrounding the touch unit 110, and may be provided as a separate member from the touch unit 110. Also, the edge unit 120 may be a separate member that is integrally formed with the installation surface 130 or provided between the installation surface 130 and the touch unit 110. The edge unit 120 can be omitted, and in this case, the touch unit 110 may be installed directly inside the installation surface 130.

In the edge unit 120, key buttons or touch buttons 121 may be positioned surrounding the touch unit 110. In other words, the user may input a gesture onto the touch unit 110, or input a signal using the buttons 121 provided in the edge unit 120 around the touch unit 110.

The touch input device 100 according to the first embodiment of the present disclosure may further include a wrist support tool 131 positioned under the touch unit 110 to support a wrist of the user. Here, a support surface of the wrist support tool 131 may be positioned higher than a touch surface of the touch unit 110. This may prevent the wrist of the user from being bent upward when the user inputs a gesture to the touch unit 110 with his or her finger while the wrist is supported by the wrist support tool 131. Therefore, it is possible to prevent a user's musculoskeletal disorder which may occur in repeated touch input processes, and to provide comfortable handling.

For example, as shown in the drawing, the wrist support tool 131 may be integrally formed with the installation surface 130 to protrude from the installation surface 130. Alternatively, the wrist support tool 131 may be a separate member provided on the installation surface 130.

Figure 2:
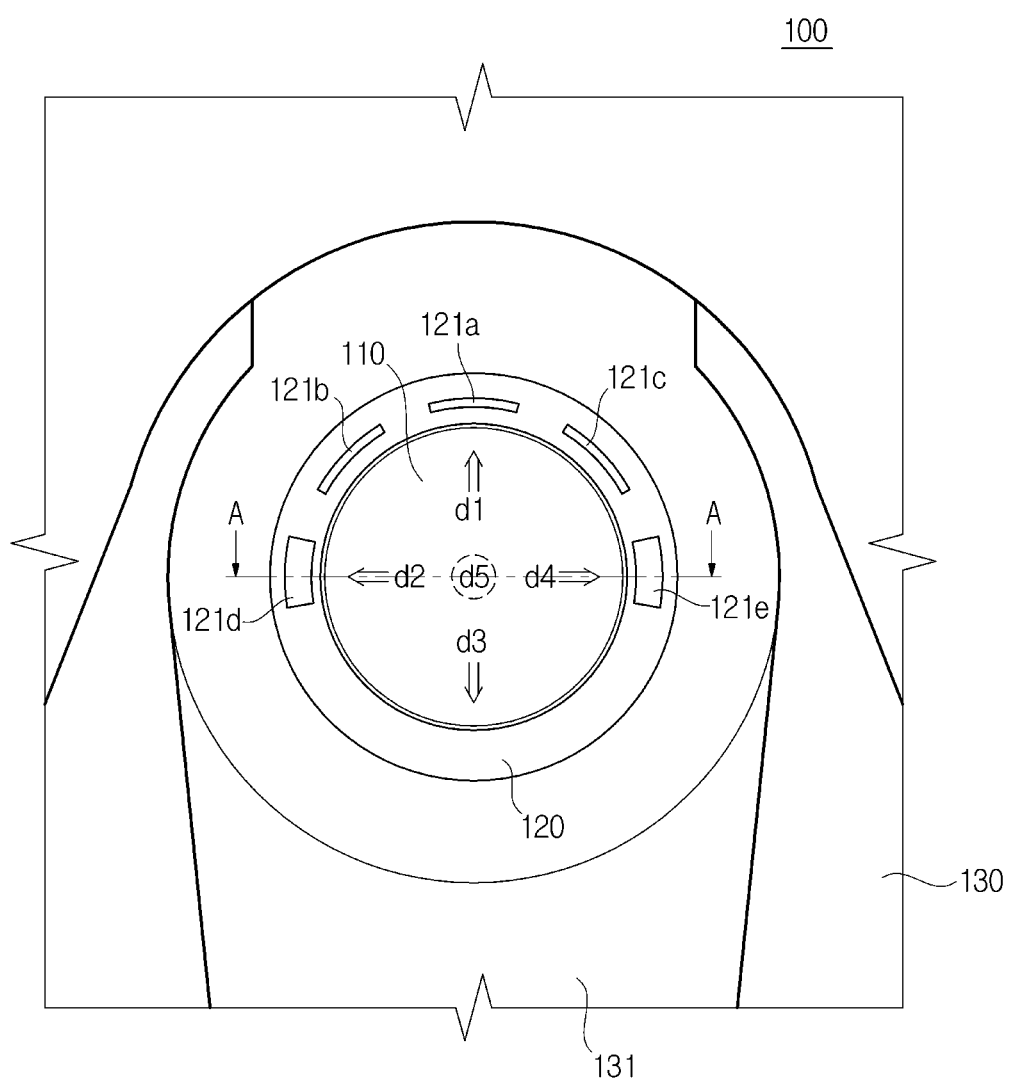
FIG. 2 is a plan view illustrating manipulation of the touch input device according to the first embodiment of the present disclosure.

FIG. 2 is a plan view illustrating manipulation of the touch input device 100 according to the first embodiment of the present disclosure.

The touch input device 100 according to the first embodiment of the present disclosure may include a control unit that may recognize a gesture signal input to the touch unit 110 and analyze the gesture signal to issue commands to various devices.

The control unit may move a cursor or a menu on a display unit (not shown) according to the position of the pointer moved on the touch unit 110. In other words, when the pointer moves from an upper portion to a lower portion, the control unit may move the cursor shown in the display unit in the same direction or move a preliminarily selected menu from an upper menu to a lower menu.

Also, the control unit may analyze a trajectory of the pointer, match the trajectory with a predetermined gesture, and execute a command defined by the matching gesture. A gesture may be input when the pointer makes a flicking, rolling, spinning, or tapping motion. In addition to this method, the user may input a gesture using various touch input methods.

Here, flicking denotes a touch input method in which the pointer in contact with the touch unit 110 moves in one direction and then breaks contact, rolling denotes a touch input method in which the pointer draws a circular arc centered on the center of the touch unit 110, spinning denotes a touch input method in which the pointer draws a circle centered at the center of the touch unit 110, and tapping denotes a touch input method in which the pointer taps the touch unit 110.

The user may also input a gesture using a multi-pointer input method. The multi-pointer input method denotes a method of inputting a gesture while two pointers are simultaneously or sequentially in contact with the touch unit 110. For example, it is possible to input a gesture while two fingers are in contact with the touch unit 110. Using the multi-pointer input method, it is possible to provide various commands or instructions which may be input by the user.

The various touch input methods include input of an arbitrary predetermined gesture as well as input of a gesture of a numeral, a character, a symbol, or so on. For example, the user may input a command by drawing consonants and vowels of the Korean alphabet, letters of the English alphabet, Arabic numerals, signs of the four fundamental arithmetic operations, etc. on the touch unit 110. When the user directly inputs a desired character, numeral, etc. on the touch unit 110 instead of selecting it on the display unit, an input time may be reduced, and a more intuitive interface may be provided.

The touch unit 110 may be capable of a pressing operation or a tilting operation. The user presses or tilts a portion of the touch unit 110 by applying pressure to the touch unit 110 and thereby may input a resultant execution signal. Here, the pressing operation includes a case of pressing the touch unit 110 in parallel with the mounting surface and a case of pressing the touch unit 110 to be tilted to one side. Also, when the touch unit 110 is flexible, it is also possible to press only a portion of the touch unit 110.

For example, the touch unit 110 may tilt in at least one direction (d1 to d4) from a central portion d5 thereof. In other words, as shown in FIG. 2, the touch unit 110 may tilt in forward, left, backward, and right directions (d1 to d4). Needless to say, according to an embodiment, the touch unit 110 may tilt in more various directions than these directions. Also, when the central portion d5 of the touch unit 110 is pressed, the touch unit 110 may be pressed in parallel with the mounting surface.

The user may press or tilt the touch input device 100 by applying pressure to the touch input device 100, thereby inputting a predetermined instruction or command. For example, the user may select a menu, etc. by pressing the central portion d5 of the touch unit 110, and may move the cursor upward by pressing an upper portion d1 of the touch unit 110.

In addition, the touch input device 100 may further include button input tools 121. The button input tools 121 may be positioned around the touch unit 110. For example, the button input tools 121 may be installed in the edge unit 120. The user may operate the buttons 121 without moving the position of a hand while inputting a gesture, so that an operation command may be rapidly given.

The button input tools 121 include a touch button and a physical button. While the touch button receives a signal through only a touch with the pointer, the physical button is changed in shape by an external physical force to receive a signal. The physical button may include, for example, a clickable button and a tiltable button.

In the drawings, five buttons 121 (121*a*, 121*b*, 121*c*, 121*d*, and 121*e*) are shown. For example, the buttons 121 may include a home button 121*a* for moving to a home menu, a back button 121*d* for moving from a current screen to a previous screen, an option button 121*e* for moving to an option menu, and two shortcut buttons 121*b* and 121*c*. The shortcut buttons 121*b* and 121*c* may be used to designate menus or devices frequently used by the user and directly move to the designated menus or devices.

Meanwhile, although not shown in the drawings, the touch input device 100 may have various operation-related components embedded therein. In the touch input device 100, a structure for enabling the touch unit 110 to be pressed or tilted in the aforementioned four directions d1 to d4 may be included. Such a structure is not shown in the drawing, but is not difficult to implement using technology that is commonly used in the related technical field.

Also, in the touch input device 100, various semiconductor chips, a printed circuit board (PCB), etc. may be installed. The semiconductor chips may be mounted on the PCB. The semiconductor chips may process information or store data. The semiconductor chips may analyze a predetermined electric signal generated according to an external force applied to the touch input device 100, a gesture recognized by the touch unit 110, or a manipulation of a button 121 provided in the touch input device 100, generate a predetermined control signal according to the analyzed content, and then transfer the predetermined control signal to a control unit, a display unit, etc. of another device.

Figure 3:
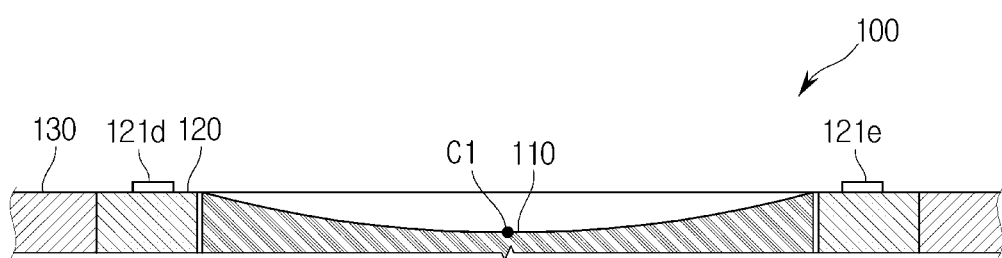
FIG. 3 is a cross-sectional view taken along line A-A of FIG. 2.

FIG. 3 is a cross-sectional view taken along line A-A of FIG. 2.

The touch unit 110 may include a portion lower than the boundary between the touch unit 110 and the edge unit 120 or the installation surface 130. In other words, the touch surface of the touch unit 110 may be positioned lower than the boundary between the touch unit 110 and the edge unit 120. For example, the touch unit 110 may be inclined downward from the boundary between the touch unit 110 and the edge unit 120, or positioned with a stepped difference from the boundary. As an example, the touch unit 110 shown in FIG. 3 according to the first embodiment of the present disclosure includes a curved surface unit including a curved concave shape.

Meanwhile, the drawing shows that the touch unit 110 is continuously inclined downward from the boundary between the touch unit 110 and the edge unit 120 without a step. Unlike this, however, the touch unit 110 may be inclined downward with a stepped difference from the boundary between the touch unit 110 and the edge unit 120.

Since the touch unit 110 includes a portion lower than the boundary between the touch unit 110 and the edge unit 120, the user can recognize the area and the boundary of the touch unit 110 by the sense of touch. When a gesture is made at the central portion of the touch unit 110, a recognition rate may increase. Also, when gestures are input at different positions, there is a danger that the gestures will be recognized as different commands even if similar gestures are input. In particular, there is a problem in a case in which the user inputs a gesture without looking at a touch region. If the user can intuitively recognize the touch region and the boundary by the sense of touch when he or she inputs a gesture while looking at the display unit or concentrating on an external situation, this may be advantageous for the user to input the gesture at a correct position. Therefore, input accuracy of a gesture is improved.

The touch unit 110 may include a concave shape. Here, the concave shape denotes a recessed or depressed shape, and may include a sunken shape with a slope or a stepped difference as well as a sunken rounded shape.

Also, the touch unit 110 may include a curved concave shape. For example, the touch unit 110 shown in the drawings according to the first embodiment is provided as a curved concave surface having a fixed curvature. In other words, the touch unit 110 may include the shape of a partial inner surface of a sphere. If the curvature of the touch unit 110 is fixed, it is possible to minimize disparate handling when the user inputs a gesture to the touch unit 110.

Further, the touch unit 110 may include a concave shape, and may gradually deepen from the edge portion toward the central portion or have a uniform depth. In other words, the touch unit 110 may not include a convex surface. This is because, when the touch unit 110 includes a convex surface, a trajectory of a gesture naturally made by the user and the curvature of the touch surface are changed, and those changes may hinder an accurate touch input. The touch unit 110 shown in FIG. 1 has the greatest depth at a center C1, and the depth increases from the edge portion toward the center C1 with a fixed curvature.

Meanwhile, the aforementioned convex surface denotes an overall convex area in the touch region of the touch unit 110 rather than a convex point in a local area. Therefore, the touch unit 110 according to an embodiment of the present disclosure includes a protrusion, such as a small bump formed at the center so that the user can recognize the position of the central portion from the bump, fine wrinkles of concentric circles in the touch unit 110, or so on.

Alternatively, the touch unit 110 may have different curvatures. For example, the touch unit 110 may include a curved concave shape whose slope becomes gentler toward the central portion. In other words, the curvature of an area close to the central portion is small (which denotes a large radius of curvature), and the curvature of an area far from the central portion, that is, the edge portion, may be large (which denotes a small radius of curvature). In this way, by making the curvature of the central portion of the touch unit 110 smaller than the curvature of the edge portion, it is possible to facilitate input of a gesture to the central portion with the pointer. Also, since the curvature of the edge portion is larger than that of the central portion, the user may sense the curvature by touching the edge portion, thereby recognizing the central portion with ease even without looking at the touch unit 110.

In the touch input device 100 according to the first embodiment of the present disclosure, the touch unit 110 includes a curved concave surface, so that the user's feeling of touch (or handling) may be improved when inputting a gesture. The curved surface of the touch unit 110 may be similar to a trajectory of a fingertip when a person makes a motion, such as a motion of moving a finger while fixing his or her wrist, or a motion of rotating or twisting a wrist with a stretched finger.

In comparison with a generally used planar touch unit, the touch unit 110 including a curved concave surface according to an embodiment of the present disclosure is ergonomic. In other words, the user's touch handling can be improved, and also fatigue of a wrist, etc. can be reduced. In addition, input accuracy can be improved compared to the case of inputting a gesture to the planar touch unit.

The touch unit 110 may have a circular shape. When the touch unit 110 has a circular shape, it is easy to form a curved concave surface. Also, since the touch unit 110 has a circular shape, the user may sense the circular touch region of the touch unit 110 by the sense of touch, and thus can easily input a circular gesture such as rolling or spinning.

In addition, when the touch unit 110 has a curved concave surface, the user may intuitively know a position in the touch unit 110 at which his or her finger is present. Since the touch unit 110 is provided as a curved surface, a slope varies according to points in the touch unit 110. Therefore, the user can intuitively know a position in the touch unit 110 at which his or her finger is present based on a slope felt by the finger.

When the user inputs a gesture to the touch unit 110 while fixing his or her gaze at a spot other than the touch unit 110, the touch unit 110, by providing feedback to the finger at any position, may help the user to input the desired gesture and improve input accuracy. For example, when the user feels that the slope of the touch unit 110 is flat through his or her finger, the user may intuitively know that he or she is touching the central portion of the touch unit 110, and intuitively know on which side of the central portion the finger is positioned by sensing the direction of a slope of the touch unit 110 with his or her finger.

Meanwhile, the diameter and the depth of the touch unit 110 may be determined within an ergonomic design range. For example, the diameter of the touch unit 110 may be selected within a range of 50 mm to 80 mm. In consideration of the average finger length of adults, a range in which a finger can naturally move once while the corresponding wrist is fixed may be selected within 80 mm. When the diameter of the touch unit 110 exceeds 80 mm, a motion of the user's hand for drawing a circle along the edge of the touch unit 110 becomes unnatural, and the corresponding wrist is used more than necessary.

On the other hand, when the diameter of the touch unit 110 is smaller than 50 mm, the area of the touch region may be reduced, and a diversity of gestures that can be input may be lost. Also, since a gesture is made in a small area, gesture input errors increase.

When the touch unit 110 has a sunken roundish shape (e.g., a partial spherical surface), a depth-to-diameter ratio of the touch unit 110 may be selected within a range of 0.04 to 0.1. The value obtained by dividing the depth of the touch unit 110 by the diameter denotes the degree of bending of a curved surface of the touch unit 110. In other words, the larger the depth-to-diameter ratio of the touch unit 110 having the same diameter, the more concave the shape of the touch unit 110 becomes. On the other hand, the smaller the depth-to-diameter ratio, the more planar the shape of the touch unit 110 becomes.

When the depth-to-diameter ratio of the touch unit 110 is larger than 0.1, the curvature of the concave shape becomes large, and the user feels discomfort upon touching. It is preferable for the concave shape of the touch unit 110 to have the curvature of a curve drawn by a fingertip in a natural finger motion of the user. However, if the depth-to-diameter ratio exceeds 0.1, when the user moves his or her finger along the touch unit 110, artificial handling is felt. Also, when the user unconsciously and naturally moves his or her finger, the fingertip may be taken off from the touch unit 110. In this case, the touch of a gesture is interrupted, and a recognition error occurs.

On the other hand, when the depth-to-diameter ratio of the touch unit 110 is smaller than 0.04, it is difficult for the user to feel a difference in handling in comparison with a planar touch unit.

Meanwhile, a touch pad used in the touch unit 110 provided as a curved surface may recognize a touch using an optical method. For example, an infrared light-emitting diode (IR LED) and photodiode array may be disposed on the rear side of the touch unit 110. IR LEDs and photodiodes obtain an infrared image reflected by the finger, and the control unit extracts a touch point from the obtained image.

Figure 4:
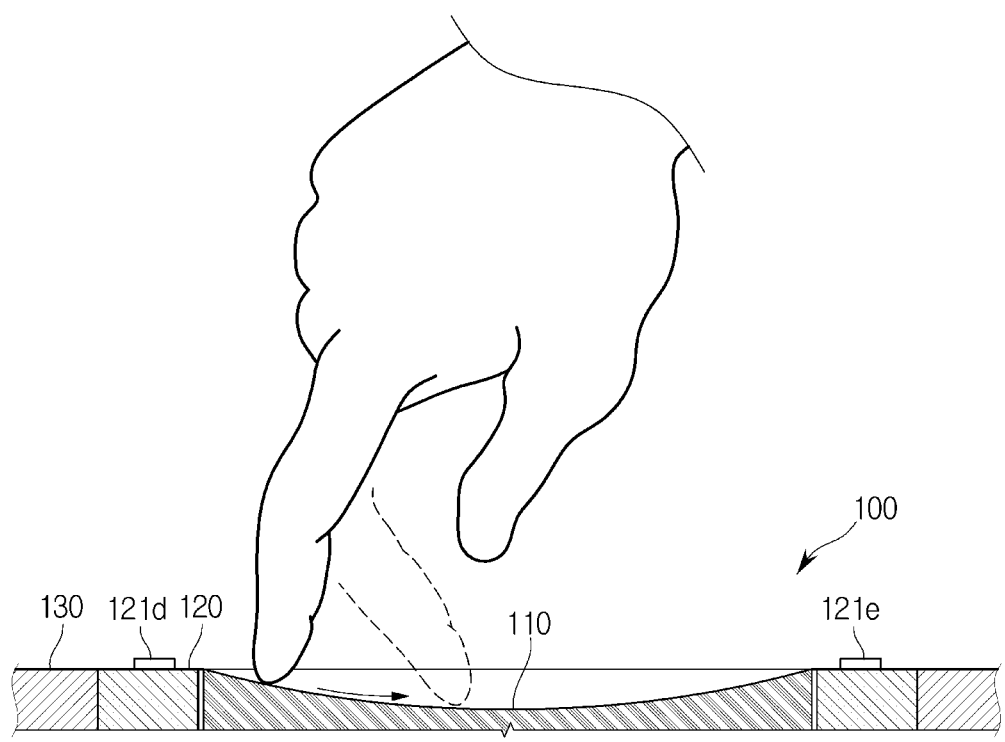
FIG. 4 is a diagram showing a trajectory of a finger when a user inputs a gesture in an longitudinal direction.
Figure 5:
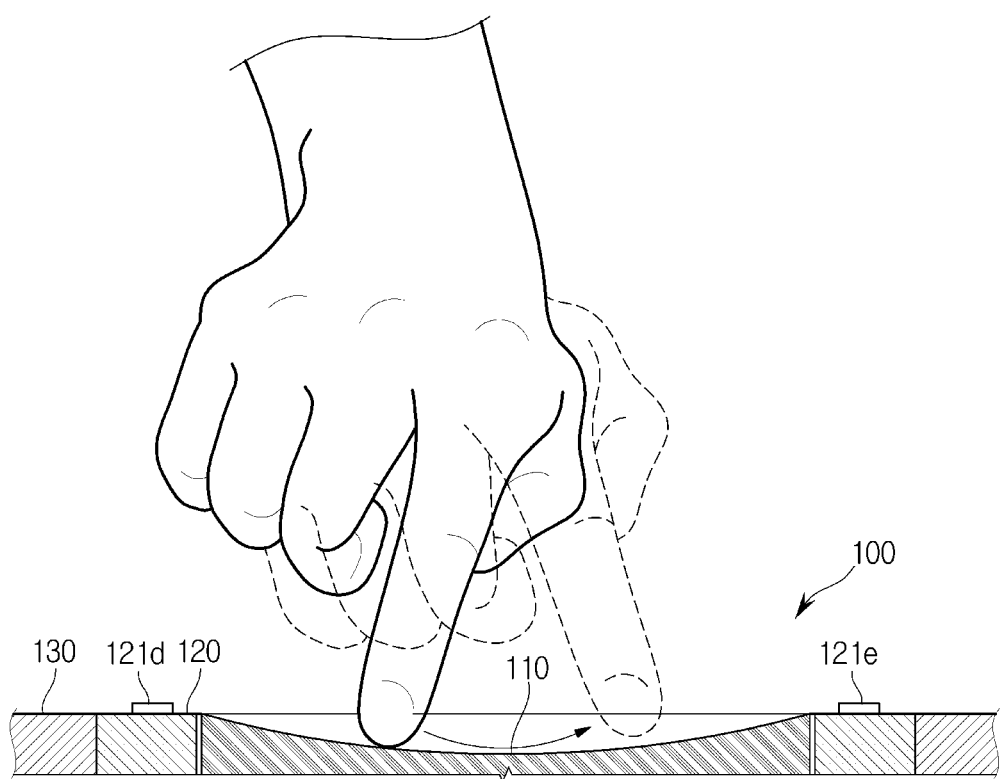
FIG. 5 is a diagram showing a trajectory of a finger when a user inputs a gesture in a horizontal direction.

FIG. 4 is a diagram showing a trajectory of a finger when a user inputs a gesture in a longitudinal direction, and FIG. 5 is a diagram showing a trajectory of a finger when a user inputs a gesture in a horizontal direction.

The touch unit 110 according to an embodiment of the present disclosure includes a curved concave surface. Here, the curvature of the touch unit 110 may be determined so that the user feels comfortable when inputting a gesture. Referring to FIG. 4, when moving a finger in a longitudinal direction, the user may input a gesture by only a natural motion of the finger without moving or bending joints other than those of the finger. Likewise, referring to FIG. 5, when moving a finger in a horizontal direction, the user may input a gesture by only a natural motion of the finger and the wrist without excessively twisting the wrist. In this way, the shape of the touch unit 110 is ergonomically designed, so that the user feels less fatigued in spite of long-time use and skeletal disorders which may be caused in wrists and other joints.

Figure 6:
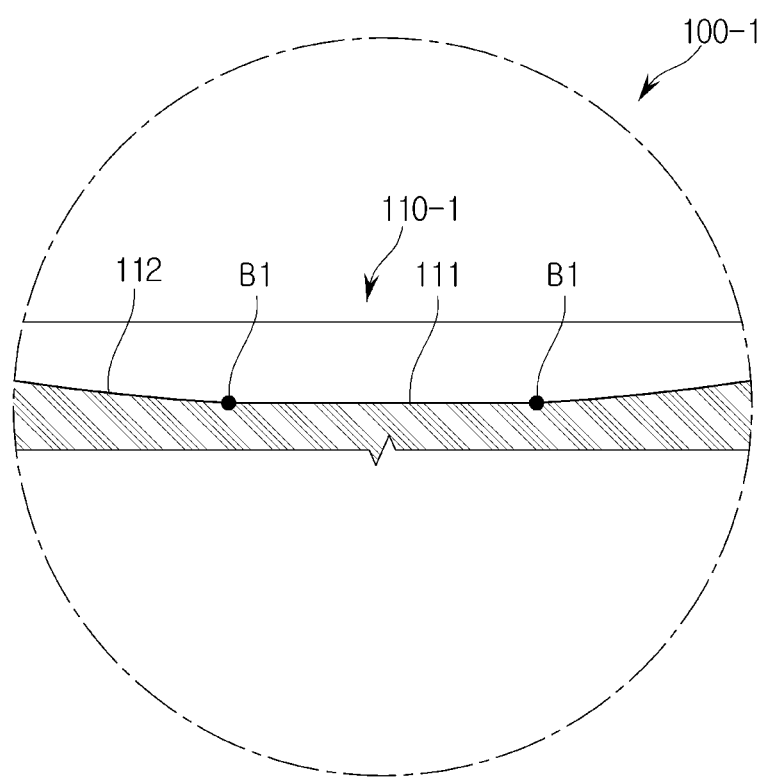
FIG. 6 is a cross-sectional view of a first modified embodiment of the touch input device according to the first embodiment of the present disclosure.
Figure 7:
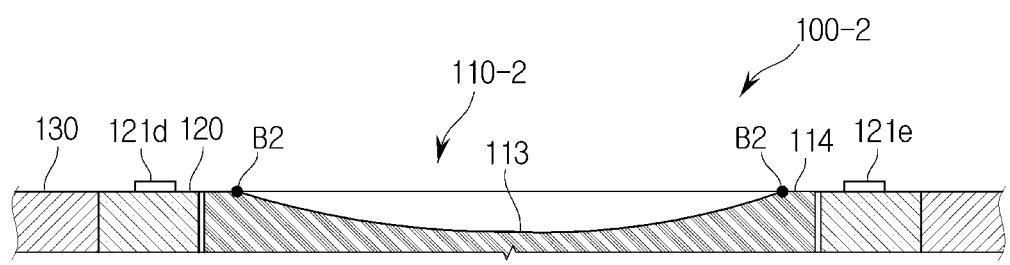
FIG. 7 is a cross-sectional view of a second modified embodiment of the touch input device according to the first embodiment of the present disclosure.

The touch unit 110 according to an embodiment of the present disclosure may include the central portion and the edge portion having different slopes or curvatures. When the touch unit 110 is provided as a planar surface or an inclined surface, the touch unit 110 has a slope, and when the touch unit 110 is provided as a curved surface, the touch unit 110 has a curvature. FIGS. 6 and 7 show different modified embodiments.

FIG. 6 is a cross-sectional view of a first modified embodiment 100-1 of the touch input device according to the first embodiment of the present disclosure.

Although not shown in the drawing, a touch unit 110-1 of the first modified embodiment 100-1 may have a circular shape (see FIG. 2). A central portion 111 of the touch unit 110-1 may have a planar surface, and an edge portion 112 may have a curved concave surface. Here, a boundary B1 between the central portion 111 and the edge portion 112 may also have a circular shape.

When a width ratio of the edge portion 112 to the central portion 111 is diversified, the touch unit 110-1 may bring about different effects. For example, when the width of the central portion 111 is relatively wide and the width of the edge portion 112 is relatively narrow, the central portion 111 provided as a planar surface may be used as a space for inputting a gesture of a character, etc., and the edge portion 112 provided as a curved surface may be used as a space for inputting a circular gesture such as rolling or spinning.

On the other hand, when the width of the central portion 111 is relatively narrow and the width of the edge portion 112 is relatively wide, the edge portion 112 provided as a curved surface may be used as a space for inputting a gesture, and the central portion 111 provided as a flat surface may be used as a mark for the user to detect the center of the touch unit 110-1.

Meanwhile, touch signals input to the central portion 111 and the edge portion 112 may be distinguished from each other. For example, a touch signal of the central portion 111 may denote a signal for a submenu, and a touch signal of the edge portion 112 may denote a signal for a menu.

FIG. 7 is a cross-sectional view of a second modified embodiment 100-2 of the touch input device according to the first embodiment of the present disclosure.

In a touch unit 110-2 of the second modified embodiment 100-2, a central portion 113 may have a curved concave surface, and an edge portion 114 may have a flat surface. Here, a boundary B2 between the central portion 113 and the edge portion 114 may have a circular shape.

Meanwhile, the central portions 111 and 113 and the edge portions 112 and 114 may have various shapes other than those of the modified embodiments shown in FIGS. 6 and 7. The central portions 111 and 113 and the edge portions 112 and 114 can be divided into two or more stages.

Figure 8:
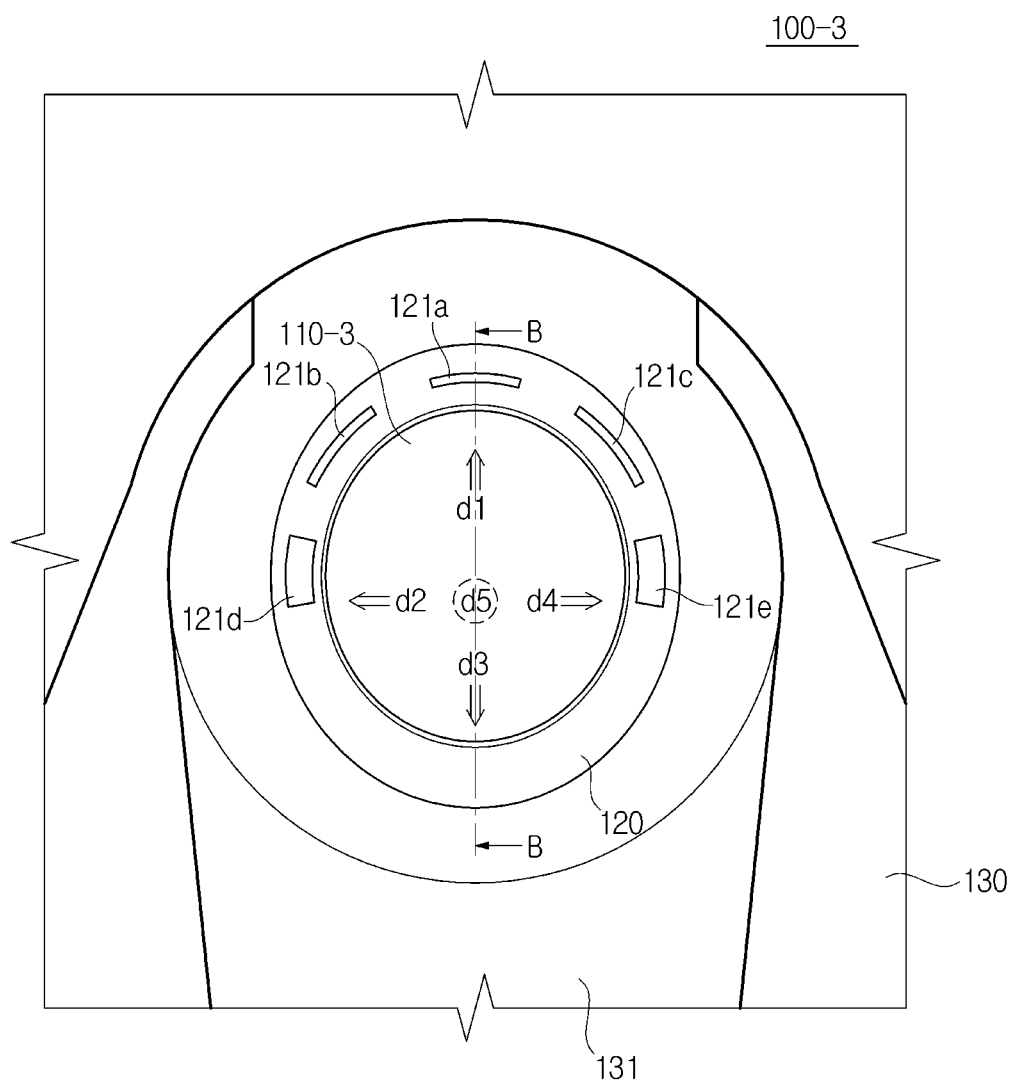
FIG. 8 is a plan view of a third modified embodiment of the touch input device according to the first embodiment of the present disclosure.
Figure 9:
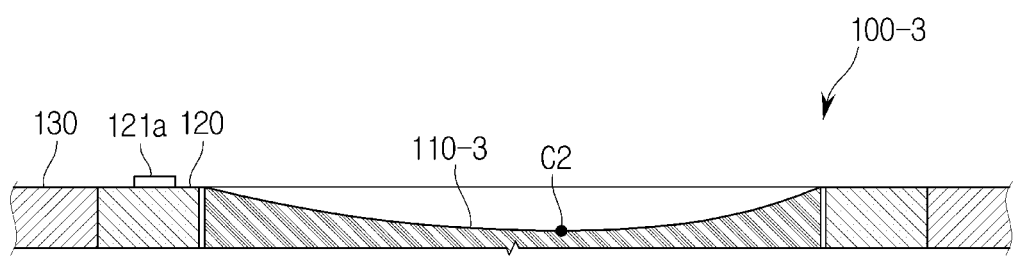
FIG. 9 is a cross-sectional view taken long line B-B of FIG. 8.

FIG. 8 is a plan view of a third modified embodiment 100-3 of the touch input device according to the first embodiment of the present disclosure, and FIG. 9 is a cross-sectional view taken long line B-B of FIG. 8.

A touch unit 110-3 according to the third modified embodiment 100-3 may have an elliptical shape. For example, as shown in FIG. 8, an inner diameter in a longitudinal direction may be larger than an inner diameter in a width direction.

A lowest point C2 in the touch unit 110-3 may be positioned to deviate in any one direction from the center. For example, as shown in FIG. 9, the lowest point C2 may be positioned to deviate downward from the center.

Figure 10:
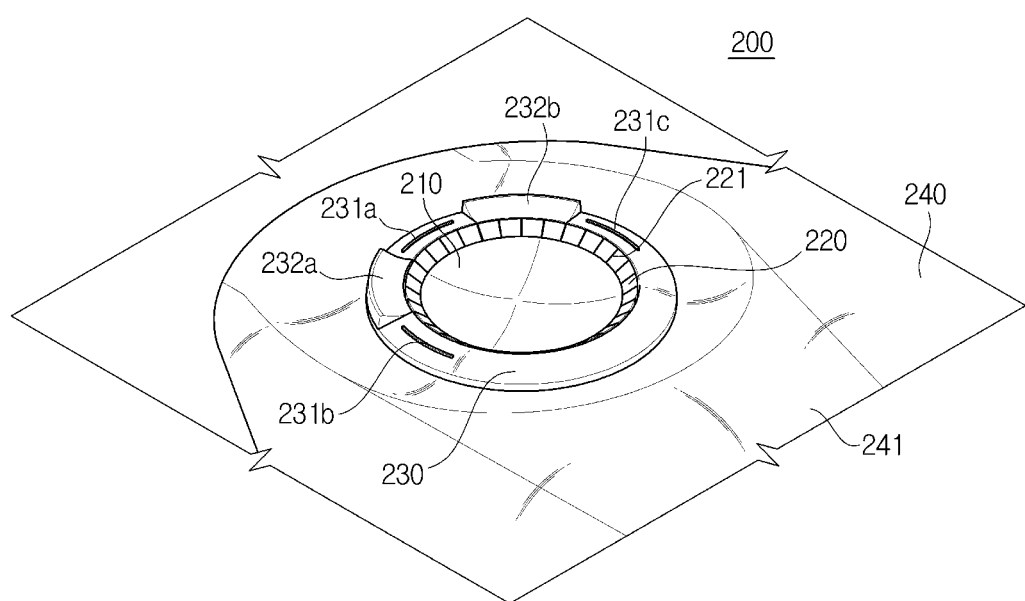
FIG. 10 is a perspective view of a touch input device according to a second embodiment of the present disclosure.

FIG. 10 is a perspective view of a touch input device 200 according to a second embodiment of the present disclosure.

The touch input device 200 according to the second embodiment of the present disclosure includes touch units 210 and 220 that may be touched by a user to receive a gesture, and an edge unit 230 surrounding the touch units 210 and 220.

The touch units 210 and 220 may include a gesture input unit 210 positioned at the central portion, and a swiping input unit 220 positioned along the edge of the gesture input unit 210. The swiping input unit 220 denotes a portion to which a swipe gesture may be input, and swipe denotes an action of inputting a gesture without taking a pointer off a touch pad.

The touch units 210 and 220 may be touch pads to which a signal is input when the user contacts or approaches the touch pads with the pointer, such as a finger or a touch pen. The user may input a desired instruction or command by inputting a predetermined touch gesture to the touch unit 210 or 220.

The touch pads may include touch films, touch sheets, etc. including touch sensors in spite of their name. Also, the touch pads may include touch panels that are display devices having touchable screens.

Meanwhile, a case in which the position of the pointer is recognized when the point is close to, but not in contact with, a touch pad is referred to as "proximity touch," and a case in which the position is recognized when the pointer comes in contact with a touch pad is referred to as "contact touch." Here, the position of a proximity touch may be the position of the pointer perpendicularly corresponding to a touch pad when the pointer approaches the touch pad.

As the touch pads, resistive touch pads, optical touch pads, capacitive touch pads, ultrasonic touch pads, or pressure touch pads may be used. In other words, various well-known touch pads may be used.

The edge unit 230 may denote a portion surrounding the touch units 210 and 220, and may be provided as a separate member from the touch units 210 and 220. In the edge unit 230, pressurizing buttons 232a and 232b and touch buttons 231a, 231b, and 231c may be positioned surrounding the touch units 210 and 220. In other words, the user may input a gesture onto the touch unit 210 or 220, or input a signal using button input tools 231 and 232 provided in the edge unit 230 around the touch units 210 and 220.

The touch input device 200 may further include a wrist support tool 241 positioned under the touch units 210 and 220 to support a wrist of the user. Here, the wrist support tool 241 may be positioned higher than the touch surfaces of the touch units 210 and 220. When the user inputs a gesture to the touch unit 210 or 220 with his or her finger while the wrist is supported by the wrist support tool 241, the wrist of the user is prevented from being bent. Therefore, it is possible to prevent a musculoskeletal disorder in the user and provide comfortable handling.

Figure 11:
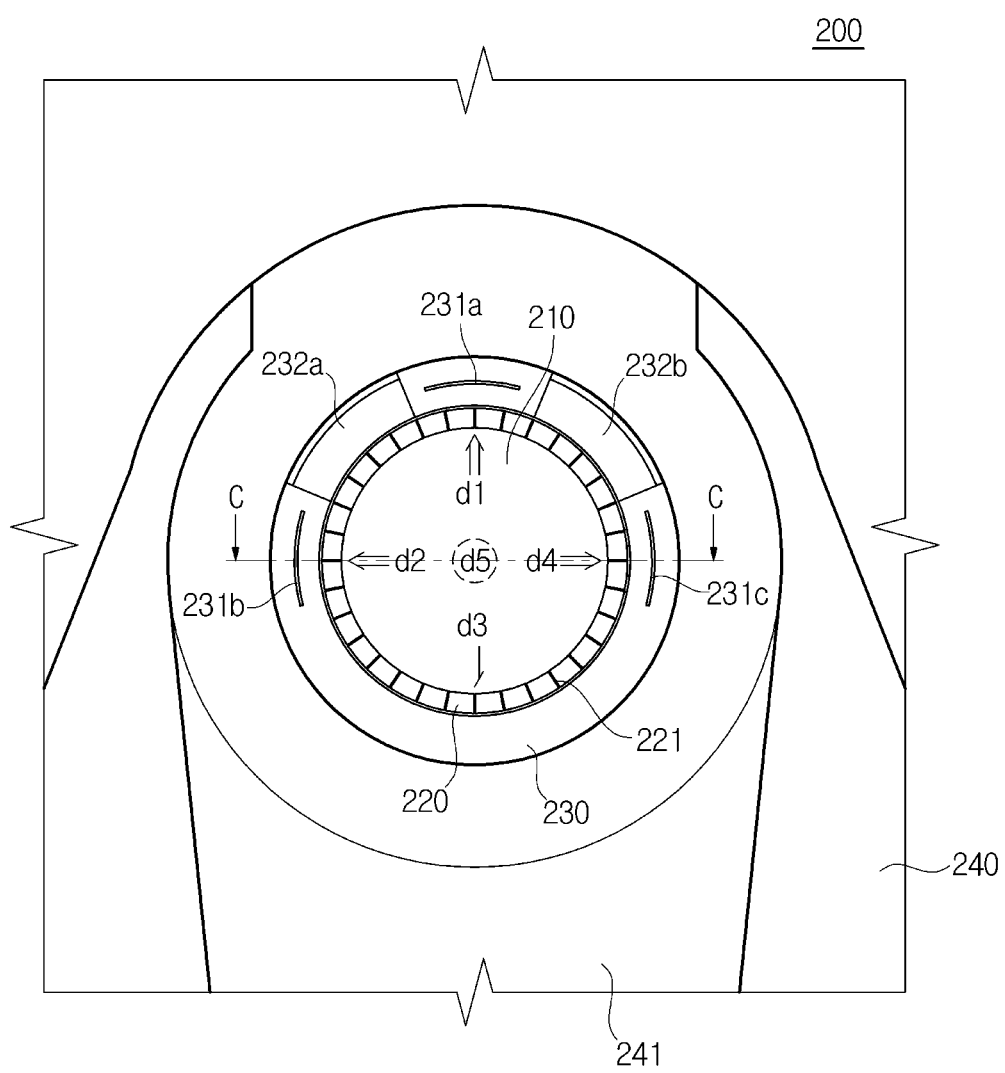
FIG. 11 is a plan view of the touch input device according to the second embodiment of the present disclosure.
Figure 12:
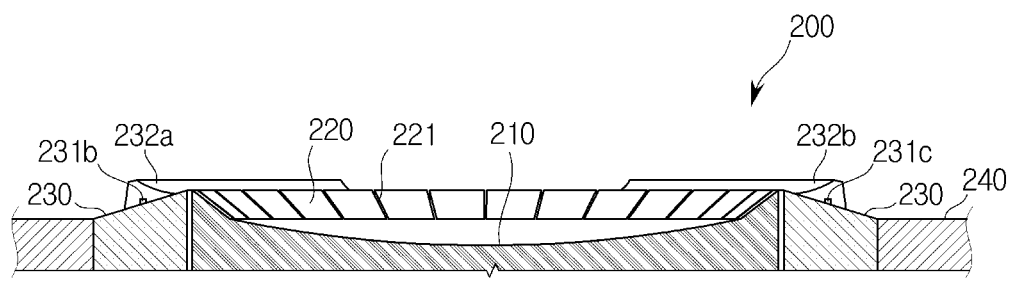
FIG. 12 is a cross-sectional view taken along line C-C of FIG. 11.

FIG. 11 is a plan view of the touch input device 200 according to the second embodiment of the present disclosure, and FIG. 12 is a cross-sectional view taken along line C-C of FIG. 11.

The touch units 210 and 220 may include portions lower than the boundary between the touch units 210 and 220 and the edge unit 230. In other words, the touch surfaces of the touch units 210 and 220 may be positioned lower than the edge unit 230. For example, the touch units 210 and 220 may be inclined downward from the boundary between the touch units 210 and 220 and the edge unit 230, or positioned with a stepped difference from the boundary.

Also, since the touch units 210 and 220 are positioned lower than the boundary between the touch units 210 and 220 and the edge unit 230, the user can recognize the areas and the boundary of the touch units 210 and 220 by the sense of touch. When a gesture is made at a central area of the touch unit 210 or 220, a recognition rate may be high. Also, when the gestures are input at different positions in the touch unit 210 or 220, there is a danger that a control unit will recognize the gestures as different commands even if similar gestures are input. In particular, there is a problem in a case in which the user inputs a gesture without looking at a touch region. If the user can intuitively recognize the touch region and the boundary by the sense of touch when he or she inputs a gesture while looking at a display unit or concentrating on an external situation, this may be advantageous for the user to input the gesture at a correct position. Therefore, input accuracy of a gesture is improved.

The touch units 210 and 220 may include a gesture input unit 210 positioned at the center and a swiping input unit 220 inclined downward along the edge of the gesture input unit 210. When the touch units 210 and 220 have a circular shape, the gesture input unit 210 may have the shape of a partial inner surface of a sphere, and the swiping input unit 220 may be an inclined surface surrounding the circumference of the gesture input unit 210.

The user may input a swipe gesture along the swiping input unit 220 having a circular shape. For example, the user may input a swipe gesture along the swiping input unit 220 in a clockwise or counterclockwise direction. A circular gesture motion, such as rolling or spinning, in the gesture input unit 210 and a gesture motion of rubbing the gesture input unit 210 from left to right are some swipe gestures, but a swipe gesture in embodiments of the present disclosure indicates a gesture input to the swiping input unit 220.

A swipe gesture input to the swiping input unit 220 may be recognized as different gestures when a start point and an end point of the input are changed. In other words, a swipe gesture input to the swiping input unit 220 on the left side of the gesture input unit 210 and the swipe gesture input to the swiping input unit 220 on the right side of the gesture input unit 210 may cause different operations. Also, even when the user contacts one point with his or her finger to input a swipe gesture, if the end point of the gesture is changed, that is, if a position from which the user takes the finger off is changed, the gesture may be recognized as different gestures.

Also, a tapping gesture may be input to the swiping input unit 220. In other words, different commands or instructions may be input according to positions in the swiping input unit 220 tapped by the user.

The swiping input unit 220 may include a plurality of gradations 221. The gradations 221 may visually or tactually inform the user of a relative position. For example, the gradations 221 may be formed by engraving or embossing. The respective gradations 221 may be disposed at regular intervals. Therefore, the user may intuitively know the number of gradations 221 which the user's finger passes by during a swipe motion, and thus may precisely adjust the length of a swipe gesture.

As an example, according to the number of gradations 221 which the user's finger passes by during a swipe gesture, a cursor shown in the display unit may move. When various selectable characters are consecutively arranged in the display unit, a selectable character may move to one side by one space every time the user's finger passes one gradation 221 while making a swipe motion.

The slope of the swiping input unit 220 according to an embodiment of the present disclosure may be larger than a tangential slope of the gesture input unit 210 at the boundary between the swiping input unit 220 and the gesture input unit 210. The user may intuitively recognize the touch region of the gesture input unit 210 from a slope difference between the gesture input unit 210 and the swiping input unit 220 when inputting a gesture onto the gesture input unit 210.

It is possible not to recognize a touch on the swiping input unit 220 while a gesture is input onto the gesture input unit 210. Therefore, even when the user's finger intrudes on the area of the swiping input unit 220 while inputting a gesture onto the gesture input unit 210, the gesture input onto the gesture input unit 210 and a gesture input onto the swiping input unit 220 may not overlap.

The gesture input unit 210 and the swiping input unit 220 may be integrally formed. Separate touch sensors or one touch sensor may be provided for the gesture input unit 210 and the swiping input unit 220. When one touch sensor is provided for the gesture input unit 210 and the swiping input unit 220, the control unit may distinguish between a gesture input signal of the gesture input unit 210 and a gesture input signal of the swiping input unit 220 by distinguishing the touch region of the gesture input unit 210 and the touch region of the swiping input unit 220.

The touch input device 200 may further include the button input tools 231 and 232. The button input tools 231 and 232 may be positioned around the touch units 210 and 220. The user may operate the button input tools 231 and 232 without changing the position of his or her hand while inputting a gesture, and thus may rapidly give an operation command.

The button input tools 231 and 232 may include the touch buttons 231a, 231b, and 231c for performing designated functions by a touch of the user, and the pressurizing buttons 232a and 232b for performing designated functions when the positions of the pressurizing buttons 232a and 232b are changed by an external force applied by the user. When the touch buttons 231a, 231b, and 231c are used, a touch sensor may be provided in the button input tools 231 and 232.

The pressurizing buttons 232a and 232b may be provided to slide vertically (in out-of-surface directions) or slide in in-surface directions by the external force. In the latter case, the user may input a signal by pulling or pushing the pressurizing button 232a or 232b. Also, the pressurizing buttons 232a and 232b may operate so that different signals are input by pushing and pulling the pressurizing button 232a or 232b.

In the drawings, the five buttons 231a, 231b, 231c, 232a, and 232b are shown. For example, the respective button input tools 231 and 232 may include the home button 231a for moving to a home menu, the back button 231b for moving from a current screen to a previous screen, the option button 231c for moving to an option menu, and the two shortcut buttons 232a and 232b. The shortcut buttons 232a and 232b are used to designate menus or devices frequently used by the user and directly move to the designated menus or devices.

As the button input tools 231 and 232 according to an embodiment of the present disclosure, the touch buttons 231a, 231b, and 231c are positioned in an upper portion and both side portions, and the pressurizing buttons 232a and 232b are respectively positioned between the touch buttons 231a and 231b and between the touch buttons 231a and 231c. In this way, the pressurizing buttons 232a and 232b are respectively positioned between the adjacent touch buttons 231a, 231b, and 231c, and thus it is possible to prevent a mistake of the user operating the touch button 231a, 231b, or 231c in spite of him or herself.

Figure 13:
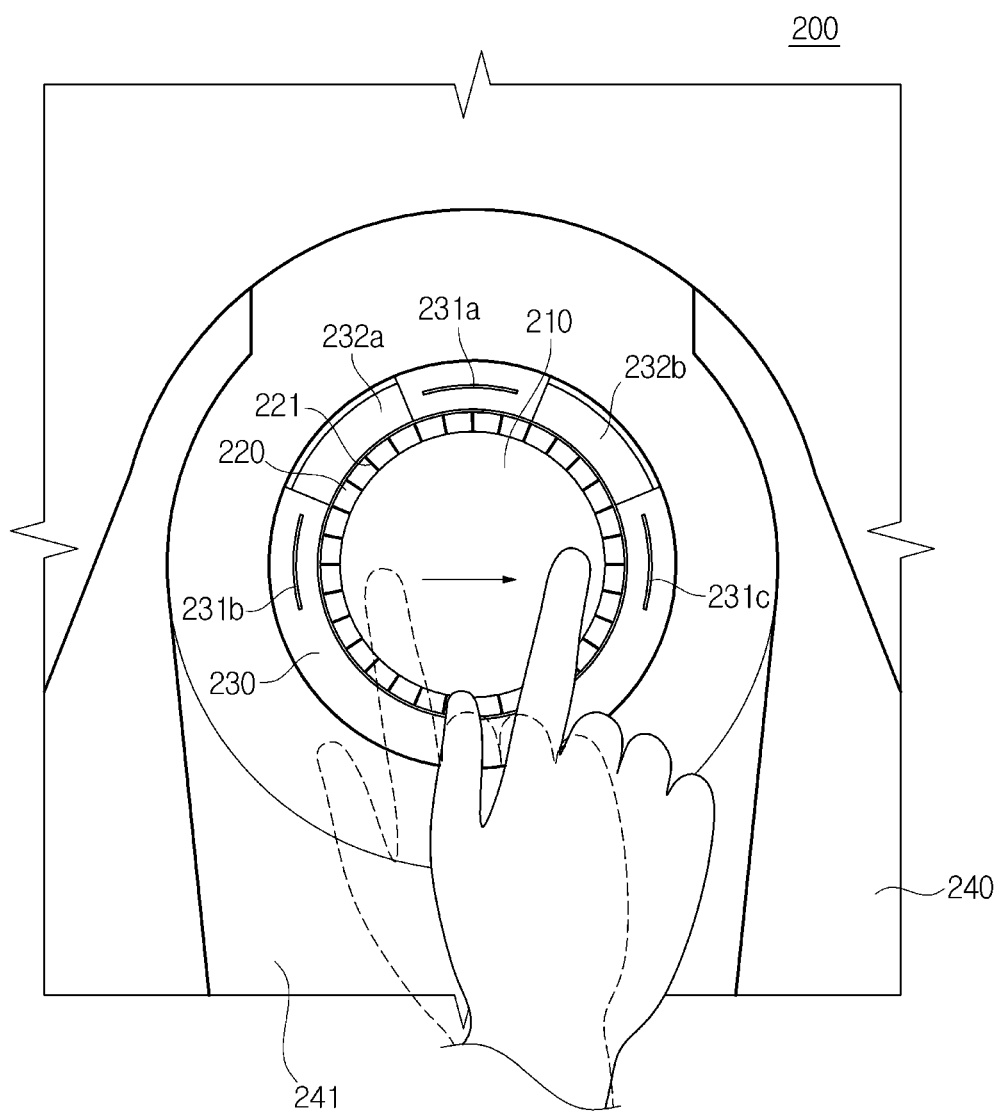
Figure 14:
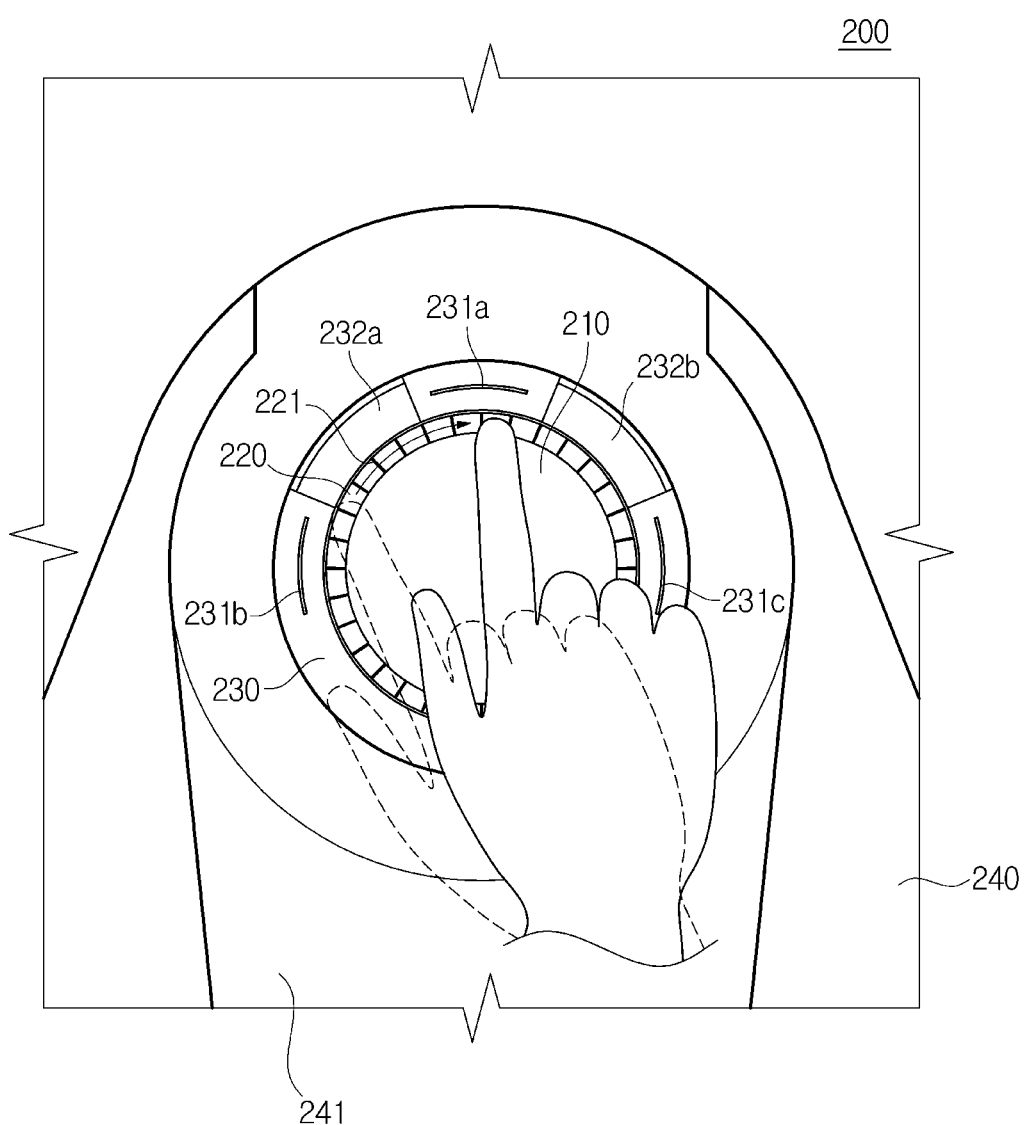
Figure 15:
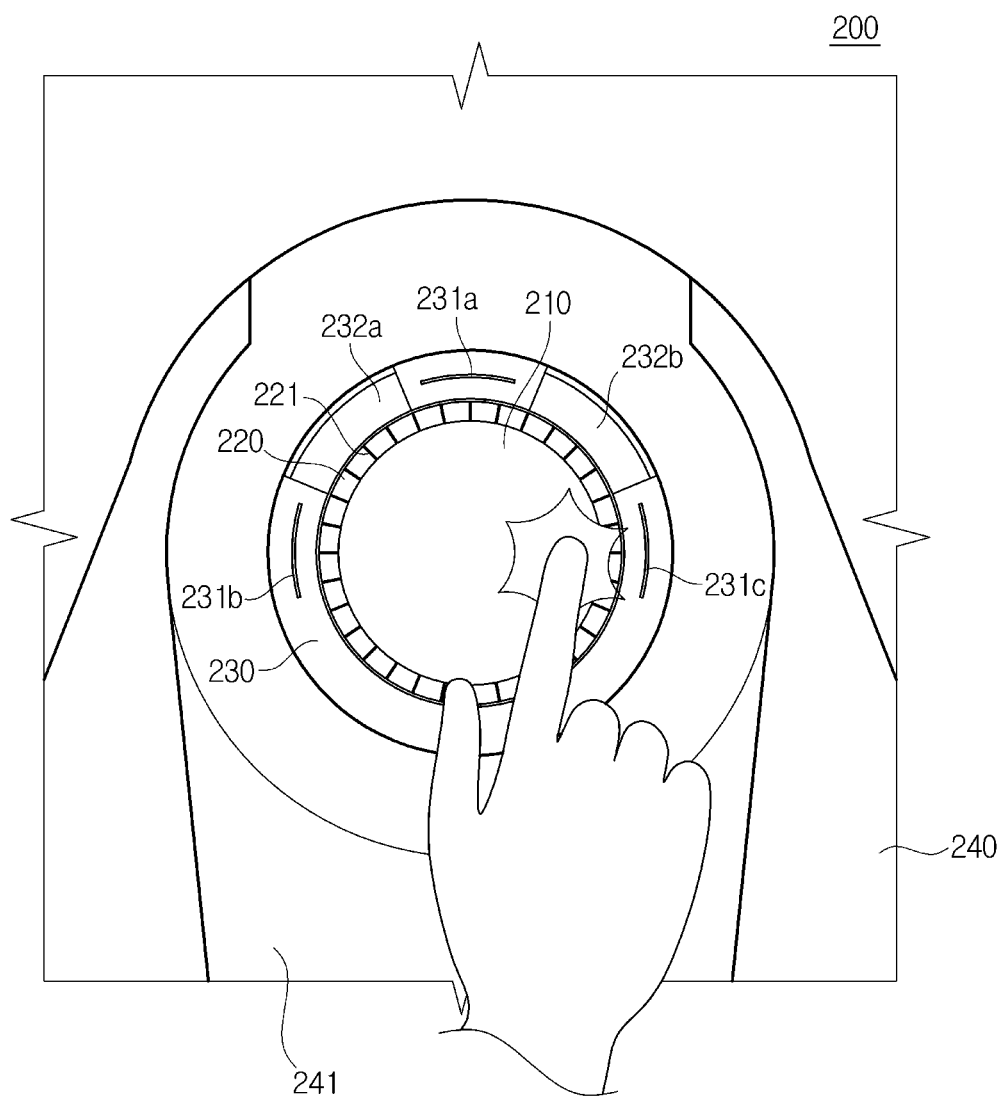

FIGS. 13 to 15 illustrate manipulation of the touch input device 200 according to the second embodiment of the present disclosure. FIG. 13 is a plan view showing a gesture input, FIG. 14 is a plan view showing a swipe input, and FIG. 15 is a plan view showing a pressing input.

Referring to FIG. 13, the user may input an operation command by making a gesture on the gesture input unit 210. FIG. 13 shows a flicking gesture of moving a pointer from left to right. Also, referring to FIG. 14, the user may input an operation command by rubbing the swiping input unit 220. FIG. 14 shows a swipe gesture of putting a pointer into contact with the left side of the swiping input unit 220 and moving the pointer to the upper side along the swiping input unit 220. Also, referring to FIG. 15, the user may input an operation command by pressing the gesture input unit 210. FIG. 15 shows a motion of pressing a right side of the gesture input unit 210.

Figure 16:
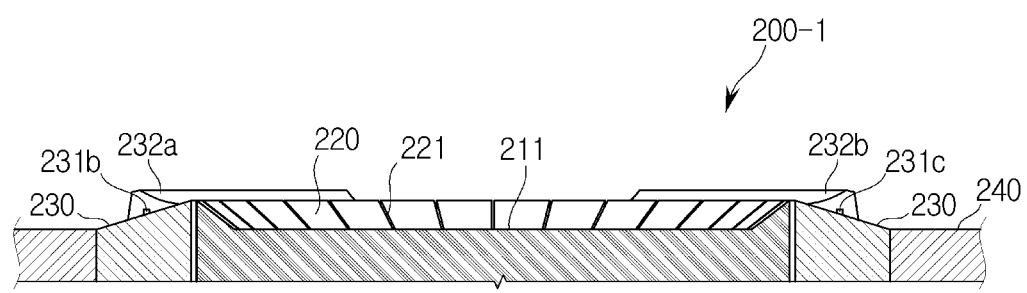
FIG. 16 is a cross-sectional view of touch units of a first modified embodiment of the touch input device according to the second embodiment of the present disclosure.

FIG. 16 is a cross-sectional view of touch units 211 and 220 of a first modified embodiment 200-1 of the touch input device according to the second embodiment of the present disclosure.

Referring to FIG. 16, as the touch units 211 and 220 according to the first modified embodiment, a gesture input unit 211 may have a planar shape, and a swiping input unit 220 may be inclined downward. Since the gesture input unit 211 is positioned lower than the boundary between the touch units 211 and 220 and the outside of the touch units 211 and 220, a user may intuitively recognize a touch region.

Also, the swiping input unit 220 is provided, so that the user easily inputs a swipe gesture.

Figure 17:
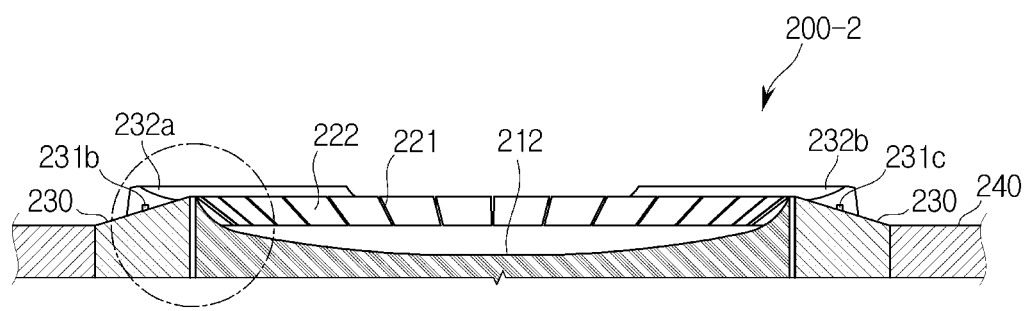
FIG. 17 is a cross-sectional view of touch units of a second modified embodiment of the touch input device according to the second embodiment of the present disclosure.
Figure 18:
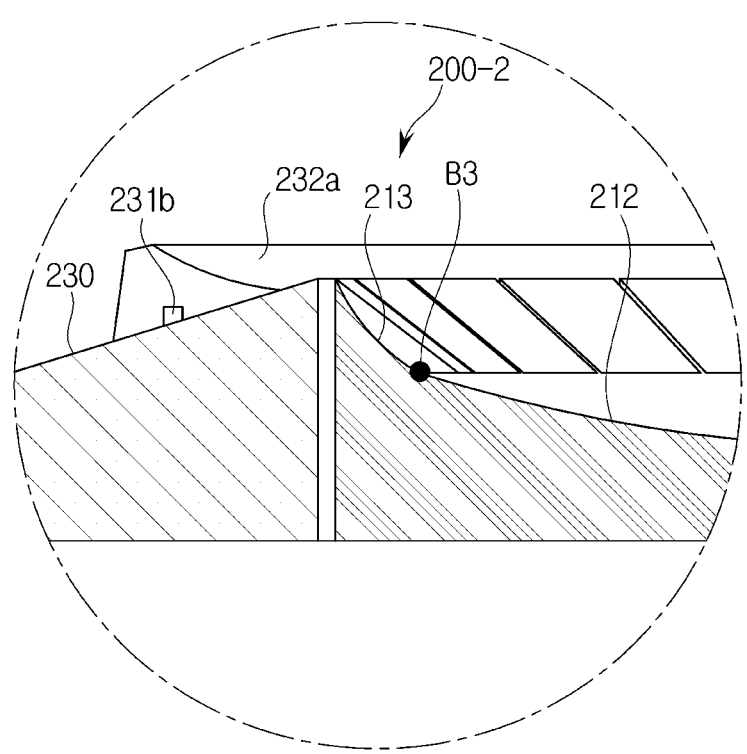
FIG. 18 is an enlarged view of a region of FIG. 17.

FIG. 17 is a cross-sectional view of touch units 212 and 222 of a second modified embodiment 200-2 of the touch input device according to the second embodiment of the present disclosure, and FIG. 18 is an enlarged view a region of FIG. 17. Referring to FIG. 17, as the touch units 212 and 222 according to the second modified embodiment of the present disclosure, a gesture input unit 212 and a swiping input unit 222 are formed to be continuous curved surfaces. Here, the curvature of the swiping input unit 222 is larger than the curvature of the gesture input unit 212. By sensing a drastic change in curvature, a user may distinguish between the swiping input unit 222 and the gesture input unit 212 even without looking at the touch units 212 and 222. Meanwhile, at a boundary B3 between the gesture input unit 212 and the swiping input unit 222, the tangential slope of an internal direction and the tangential slope of an external direction differ from each other.

Figure 19:
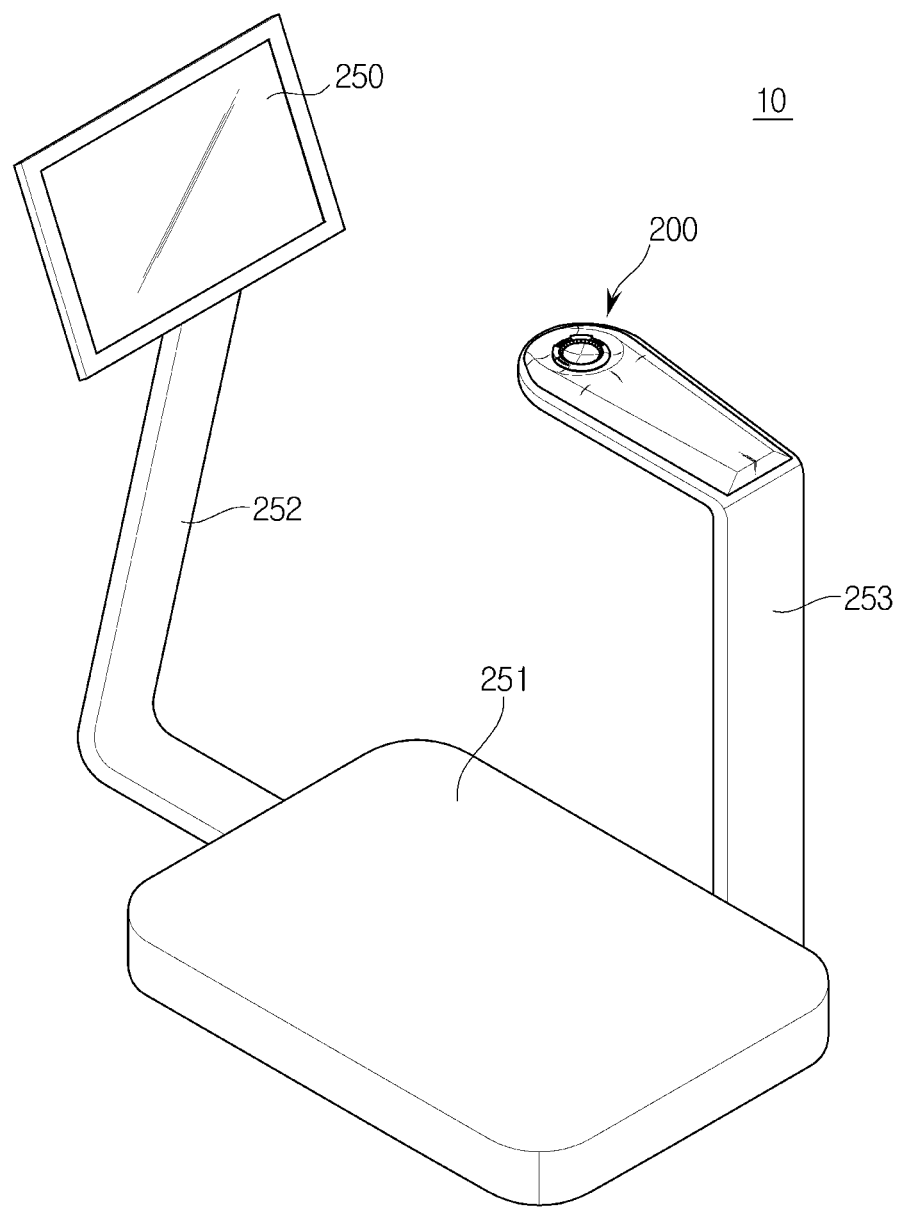
FIG. 19 is a perspective view of the touch input device according to the second embodiment of the present disclosure installed in an exercise machine.

FIG. 19 is a perspective view of the touch input device 200 according to the second embodiment of the present disclosure installed in an exercise machine 10.

The touch input device 200 according to the embodiment of the present disclosure may be installed in the exercise machine 10. Here, the exercise machine 10 may include a medical device. The exercise machine 10 may include a body unit 251 on which a user may stand, a display unit 250, a first connection unit 252 that connects the body unit 251 and the display unit 250, the touch input device 200, and a second connection unit 253 that connects the touch input device 200 and the body unit 251.

The body unit 251 may measure various physical information, including the user's weight. The display unit 250 may display various image information including the measured physical information. The user may manipulate the touch input device 200 while looking at the display unit 250.

The touch input device 200 according to the embodiment of the present disclosure may also be installed in a vehicle 20.

Here, the vehicle 20 denotes various machines that transport a subject to be carried, such as a person, an object, or an animal, from an origin to a destination. The vehicle 20 may include a car that travels on a road or a railroad, a ship that moves on an ocean or a river, an airplane that flies in the sky using the action of the air, and so on.

Also, a car traveling on a road or a railroad may move in a predetermined direction according to rotation of at least one wheel, and may include, for example, a three- or four-wheeled car, construction machinery, a two-wheeled car, a motor bicycle, a bicycle, and a train traveling on a railroad.

Figure 20:
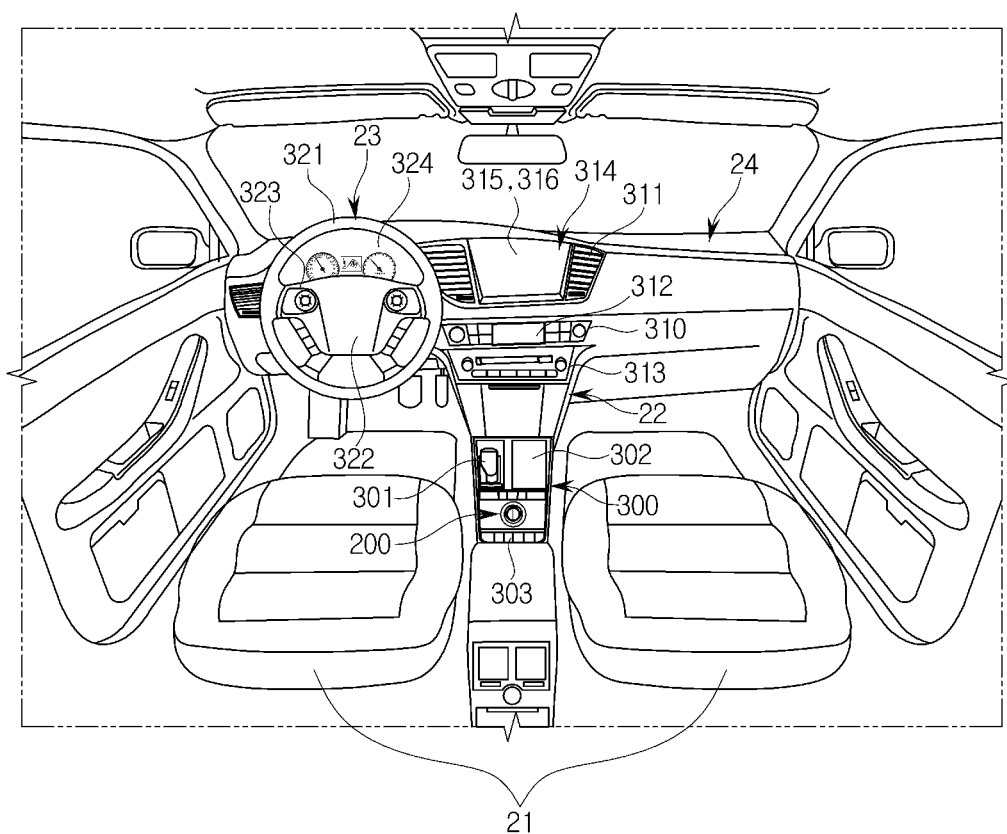
FIG. 20 shows the interior appearance of a car in which the touch input device according to the second embodiment of the present disclosure is installed.
Figure 21:
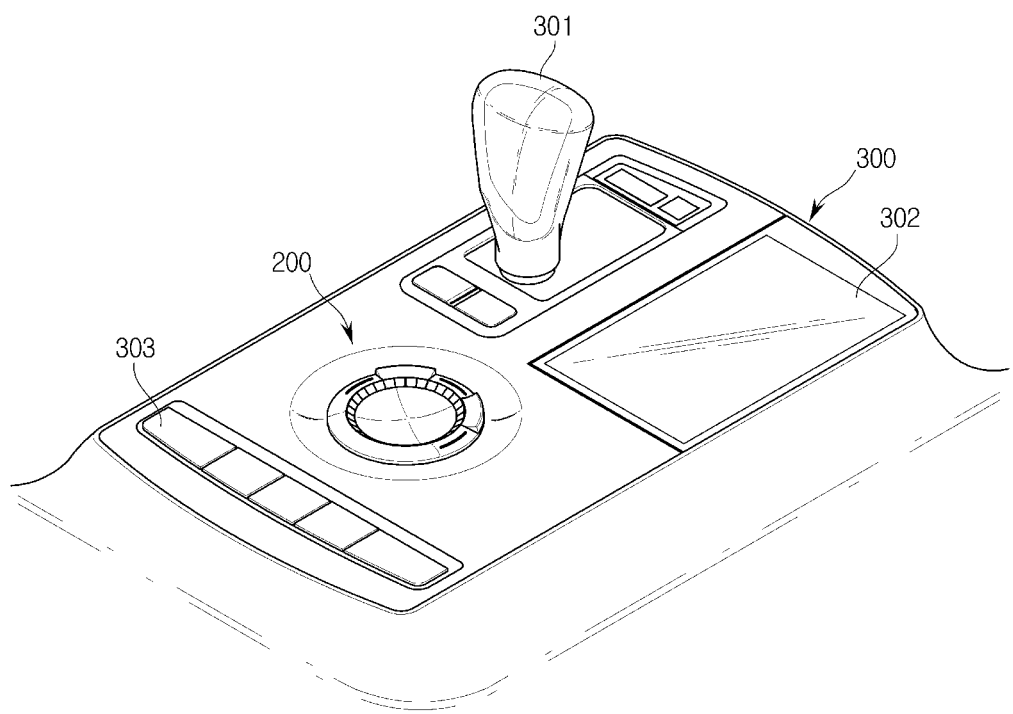
FIG. 21 is a perspective view of a gearbox in which the touch input device according to the second embodiment of the present disclosure is installed.

FIG. 20 shows an interior appearance of a vehicle 20 in which the touch input device 200 according to the second embodiment of the present disclosure is installed, and FIG. 21 is a perspective view of a gearbox 300 in which the touch input device 200 according to the second embodiment of the present disclosure is installed.

Referring to FIG. 20, the vehicle 20 may include seats 21 on which a driver, etc. sit, the gearbox 300, and a dashboard 24 including a center fascia 22, a steering wheel 23, and so on.

In the center fascia 22, an air conditioning system 310, a clock 312, an audio system 313, an audio/video navigation (AVN) system 314, etc. may be installed.

The air conditioning system 310 keeps the inside of the vehicle 20 pleasant by adjusting a temperature, humidity, air quality, and an air flow in the vehicle 20. The air conditioning system 310 may include at least one outlet 311 that is installed in the center fascia 22 and discharges air. Buttons, dials, etc. for controlling the air conditioning system 310, etc. may be installed in the center fascia 22. A user, such as a driver, may control the air conditioning system 310 using the buttons disposed in the center fascia 22.

The clock 312 may be provided close to a button or a dial for controlling the air conditioning system 310.

The audio system 313 includes an operation panel in which a plurality of buttons for performing functions of the audio system 313 is provided. The audio system 313 may provide a radio mode for providing radio functions and a media mode for playing audio files stored in various storage media.

The AVN system 314 may be embedded in the center fascia 22 or formed to protrude from the dashboard 24. The AVN system 314 may comprehensively perform audio functions, video functions, and navigation functions according to an operation of the user. The AVN system 314 may include an input unit 315 for receiving a user command for the AVN system 314, and a display unit 316 for displaying a screen related to audio functions, a screen related to video functions, or a screen related to navigation functions. Meanwhile, an element that is common to both the AVN system 314 and the audio system 313 may be omitted from the audio system 313.

The steering wheel 23 is a device for adjusting a traveling direction of the vehicle 20. The steering wheel 23 may include a rim 321 grasped by the driver, and a spoke 322 connected to a steering system of the vehicle 20 and connecting the rim 321 and a hub of a rotation axis for steering. According to an embodiment, an operation device 323 for controlling various devices in the vehicle 20, for example, the audio system 313, etc., may be formed in the spoke 322.

The dashboard 24 may further include an instrument panel 324 that notifies the driver of various vehicle information, such as vehicle speed, travel distance, engine revolutions per minute (RPM), the amount of lubrication, a coolant temperature, and various warnings during travel, a glove box for storing various objects, and so on.

The gearbox 300 may be generally installed between a driver's seat and a front passenger seat, and operation devices required to be manipulated while the driver drives the vehicle 20 may be installed therein.

Referring to FIG. 21, in the gearbox 300, a gearshift 301 for changing speed of the vehicle 20, a display unit 302 for controlling the performing of functions of the vehicle 20, and buttons 303 for operating various devices in the vehicle 20 may be installed. Also, the touch input device 200 according to the second embodiment of the present disclosure may be installed.

The touch input device 200 according to the embodiment of the present disclosure may be installed in the gearbox 300 so that the driver can manipulate the touch input device 200 with his or her eyes kept forward during driving. For example, the touch input device 200 may be positioned under the gearshift 301. Alternatively, the touch input device 200 may be installed in the center fascia 22, the front passenger seat, or a back seat.

The touch input device 200 may be connected to display devices in the vehicle 20, so that various icons, etc. displayed on the display devices may be selected or executed. The display devices in the vehicle 20 may be installed in the audio system 313, the AVN system 314, the instrument panel 324, and so on. Also, the display unit 302 may be installed in the gearbox 300 as necessary. The display devices may be connected to a head-up display (HUD) device, a back mirror, or so on.

For example, the touch input device 200 may move a cursor displayed on the display devices, or execute icons. The icons may include a main menu, a selection menu, a setting menu, and so on. Also, through the touch input device 200, it is possible to operate a navigation device, set a running condition of the vehicle 20, or operate peripheral devices of the vehicle 20.

As is apparent from the above description, a touch input unit of a touch input device according to an embodiment of the present disclosure includes a concave (or recessed or depressed) shape and thus can provide improved handling and feeling of touch when a user inputs a gesture. Also, since the shape of the touch input unit is ergonomically designed, even when the user uses the touch input device for a long time, it is possible to prevent damage to a joint of his or her wrist or a dorsum of his or her hand.

Since the touch input unit is formed to be lower than surroundings, the user can intuitively know a touch region without looking at the touch input unit, so that a gesture recognition rate can be improved.

Since the touch input unit includes a curved concave surface, even when the user uses the touch input device without looking at the touch input unit, that is, while looking at a display or looking forward, the user can intuitively know a point in the touch input unit at which his or her finger is present based on a slope felt by the finger.

Therefore, the user can easily input a gesture while looking at a display unit without looking at the touch input unit, and can input a precise gesture at a correct position, so that a gesture recognition rate can be improved.

In particular, if the touch input device according to an embodiment of the present disclosure is applied to a vehicle, a driver can input a precise gesture while keeping his or her eyes to the front when the driver manipulates a navigation system, an audio system, etc. at the wheel.

A swiping input unit can be provided around a gesture input unit to serve as a dial that physically rotates. Also, the swiping input unit can recognize various touch gestures, so that various functions improved more than the dial function can be performed.

Gradations that can be felt by the sense of touch are formed on the swiping input unit, so that the user can intuitively know a swipe angle (or distance). Therefore, by making it possible to input different signals according to swipe angles (or distances), the degree of freedom of manipulation can be improved, and input accuracy can be improved.

Slopes of the gesture input unit and the swiping input unit are made different from each other, so that the user can intuitively distinguish between the gesture input unit and the swiping input unit by a touch.

The touch input unit is pressed in several directions and performs different functions according to pressed directions, so that an instruction can be rapidly performed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input device comprising:
 a touch unit to which a user can input a touch gesture, wherein the touch unit includes:
  a gesture input unit positioned at a center of the touch unit; and
  a swiping input unit configured to be inclined downward along an edge of the gesture input unit, wherein the swiping input unit has a surface area smaller than that of the gesture input unit, wherein the gesture input unit and the swiping input unit receive separate touch signals, wherein the swiping input unit includes a plurality of graduations arranged at uniform intervals along the circumference of the swiping input unit, wherein the swiping input unit is rotatably provided with respect to the gesture input unit, wherein the swiping input unit is configured to be pressed or tilted by a pressure applied by the user to receive a signal, wherein the swiping input unit is inclined downward from the gesture input unit in a stepwise manner, wherein a boundary of the swiping input unit is positioned higher than a boundary of the gesture input unit, wherein a slope of the swiping input unit is constant, wherein the slope of the swiping input unit is equal to or greater than a maximum slope of the gesture input unit, and wherein the swiping input unit is configured not to recognize a touch on the swiping input unit while the touch gesture is input onto the gesture input unit.

2. The touch input device according to claim 1, wherein the gesture input unit has a circular shape, and
   the swiping input unit surrounds a circumferential edge of the gesture input unit.

3. The touch input device according to claim 2, wherein the swiping input unit is integrally formed with the gesture input unit, and inclined downward toward the gesture input unit.

4. The touch input device according to claim 1, wherein the gesture input unit includes a concave shape.

5. The touch input device according to claim 4, wherein the gesture input unit gradually deepens from an edge portion to a central portion.

6. The touch input device according to claim 5, wherein the gesture input unit includes a partial spherical shape.

7. The touch input device according to claim 4, wherein the slope of the swiping input unit is larger than a tangential slope of the gesture input unit adjoining the swiping input unit.

8. The touch input device according to claim 4, wherein the gesture input unit includes a curved concave shape whose slope becomes gentler toward a central portion.

9. The touch input device according to claim 4, wherein the gesture input unit has a greatest depth at a central portion.

10. The touch input device according to claim 4, wherein the gesture input unit has an elliptical shape, and
    a lowest area of the gesture input unit is positioned to deviate in any one direction from a center of the gesture input unit.

11. The touch input device according to claim 4, wherein the gesture input unit is configured to receive a pressing operation.

12. The touch input device according to claim 4, wherein the gesture input unit is configured to receive a tilting operation.

13. The touch input device according to claim 12, wherein the gesture input unit is configured to receive a tilting operation in four directions, that is, up, down, left and right, directions.

14. The touch input device according to claim 4, wherein the gesture input unit is pressed or tilted by a pressure applied by the user to receive a signal.

15. The touch input device according to claim 1, further comprising a button input tool for performing designated functions.

16. The touch input device according to claim 15, wherein the button input tool comprises:
    a touch button for performing a designated function by a touch of the user; and
    a pressurizing button for performing a designated function when a position of the pressurizing button is changed by an external force applied by the user.

17. The touch input device according to claim 1, further comprising a wrist support tool positioned on one side of the touch unit to support a wrist of the user, and protruding higher than a touch surface of the touch unit.

18. A touch input device comprising:
    a touch unit configured to receive a touch gesture of a user, which includes a gesture input unit positioned at a center and a swiping input unit provided along an edge of the gesture input unit; and
    an edge unit surrounding the swiping input unit,
    wherein the swiping input unit gradually deepens from an edge portion toward a central portion, wherein the swiping input unit has a surface area smaller than that of the gesture input unit,
    wherein the gesture input unit and the swiping input unit receive separate touch signals,
    wherein the swiping input unit includes a plurality of graduations arranged at uniform intervals along the circumference of the swiping input unit,
    wherein the swiping input unit is rotatably provided with respect to the gesture input unit,
    wherein the swiping input unit is configured to be pressed or tilted by a pressure applied by the user to receive a signal,
    wherein the swiping input unit is inclined downward from the gesture input unit in a stepwise manner,
    wherein a boundary of the swiping input unit is positioned higher than a boundary of the gesture input unit,
    wherein a slope of the swiping input unit is constant,
    wherein the slope of the swiping input unit is equal to or greater than a maximum slope of the gesture input unit, and
    wherein the swiping input unit is configured not to recognize a touch on the swiping input unit while the touch gesture is input onto the gesture input unit.

19. The touch input device according to claim 18, wherein the swiping input unit is inclined downward between the edge unit and the gesture input unit.

20. A vehicle comprising:
    a touch unit to which a user can input a touch gesture, wherein the touch unit includes:
        a gesture input unit positioned at a center of the touch unit; and
        a swiping input unit configured to be inclined downward along an edge of the gesture input unit, wherein the swiping input unit has a surface area smaller than that of the gesture input unit,
    wherein the gesture input unit and the swiping input unit receive separate touch signals,
    wherein the swiping input unit includes a plurality of graduations arranged at uniform intervals along the circumference of the swiping input unit,
    wherein the swiping input unit is rotatably provided with respect to the gesture input unit,
    wherein the swiping input unit is configured to be pressed or tilted by a pressure applied by the user to receive a signal,
    wherein the swiping input unit is inclined downward from the gesture input unit in a stepwise manner, wherein a boundary of the swiping input unit is positioned higher than a boundary of the gesture input unit, wherein a slope of the swiping input unit is constant, wherein the slope of the swiping input unit is equal to or greater than a maximum slope of the gesture input unit, and wherein the swiping input unit is configured not to recognize a touch on the swiping input unit;

a display device; and a control unit configured to operate the display device according to an input signal input to the touch input device.

21. The vehicle according to claim 20, wherein the display device is included in at least one of, an audio system, an audio/video navigation (AVN) system, a dashboard, and a head-up display (HUD) device.

22. The vehicle according to claim 20, wherein the control unit converts a gesture input to the touch input device into the input signal, and sends an operation signal to display an operation supported by the input signal on the display device.

23. The vehicle according to claim 20, wherein the touch input device is installed in a gearbox.

* * * * *